(12) United States Patent
Paré et al.

(10) Patent No.: US 8,960,692 B2
(45) Date of Patent: Feb. 24, 2015

(54) SEMI-GENERIC UNDERFRAME ASSEMBLY FOR A VEHICLE

(71) Applicant: Soucy International Inc., Drummondville (CA)

(72) Inventors: Steeve Paré, St-Majorique (CA); Steve Fréchette, Drummondville (CA); Serge Latulippe, St-Hyacinthe (CA); William Gasse, Drummondville (CA); André Léger, Drummondville (CA)

(73) Assignee: Soucy International Inc., Drummondville, Quebec (CA)

( * ) Notice: Subject to any disclaimer, the term of this patent is extended or adjusted under 35 U.S.C. 154(b) by 0 days.

(21) Appl. No.: 13/866,083

(22) Filed: Apr. 19, 2013

(65) Prior Publication Data
US 2013/0277928 A1 Oct. 24, 2013

Related U.S. Application Data

(60) Provisional application No. 61/636,154, filed on Apr. 20, 2012.

(51) Int. Cl.
| | |
|---|---|
| *B62D 55/04* | (2006.01) |
| *B62D 55/06* | (2006.01) |
| *B62D 21/00* | (2006.01) |
| *B62D 21/11* | (2006.01) |
| *B62D 21/18* | (2006.01) |
| *B62D 55/065* | (2006.01) |

(52) U.S. Cl.
CPC .............. *B62D 55/06* (2013.01); *B62D 21/00* (2013.01); *B62D 55/04* (2013.01); *B62D 21/11* (2013.01); *B62D 21/186* (2013.01); *B62D 55/065* (2013.01)
USPC ...................................................... 280/28.5

(58) Field of Classification Search
CPC ........................................................ B62D 21/00
USPC ......... 105/413; 180/9.21, 311, 312; 280/28.5, 280/781, 785
See application file for complete search history.

(56) References Cited

U.S. PATENT DOCUMENTS

| | | | |
|---|---|---|---|
| 5,005,922 A | 4/1991 | Edwards et al. | |
| 6,494,472 B2 * | 12/2002 | Suzuki | 280/124.109 |
| 7,870,914 B2 * | 1/2011 | Todd et al. | 180/9.1 |
| 2008/0164754 A1 | 7/2008 | Breton et al. | |

FOREIGN PATENT DOCUMENTS

WO    WO 2011/000093 A1    1/2011

* cited by examiner

*Primary Examiner* — Joseph Rocca
*Assistant Examiner* — Felicia L Brittman
(74) *Attorney, Agent, or Firm* — Robert Brouillette; Brouillette & Partners

(57) ABSTRACT

A semi-generic underframe assembly configured to be mounted to an underside of a vehicle is disclosed. The underframe assembly provides preconfigured mounting locations where track systems used to replace wheels can be properly mounted. The underframe assembly comprises at least one customized adapter frame particularly configured to be mounted at specific locations on the underside of a specific model of vehicle, and at least one generic adapter frame configured to be mounted to the customized adapter frame, the at least one generic adapter frame generally comprising the preconfigured mounting locations. The underframe assembly generally allows track systems to be mounted to the vehicle while avoiding attachment at inconvenient and/or weak locations.

20 Claims, 14 Drawing Sheets

FIG_1

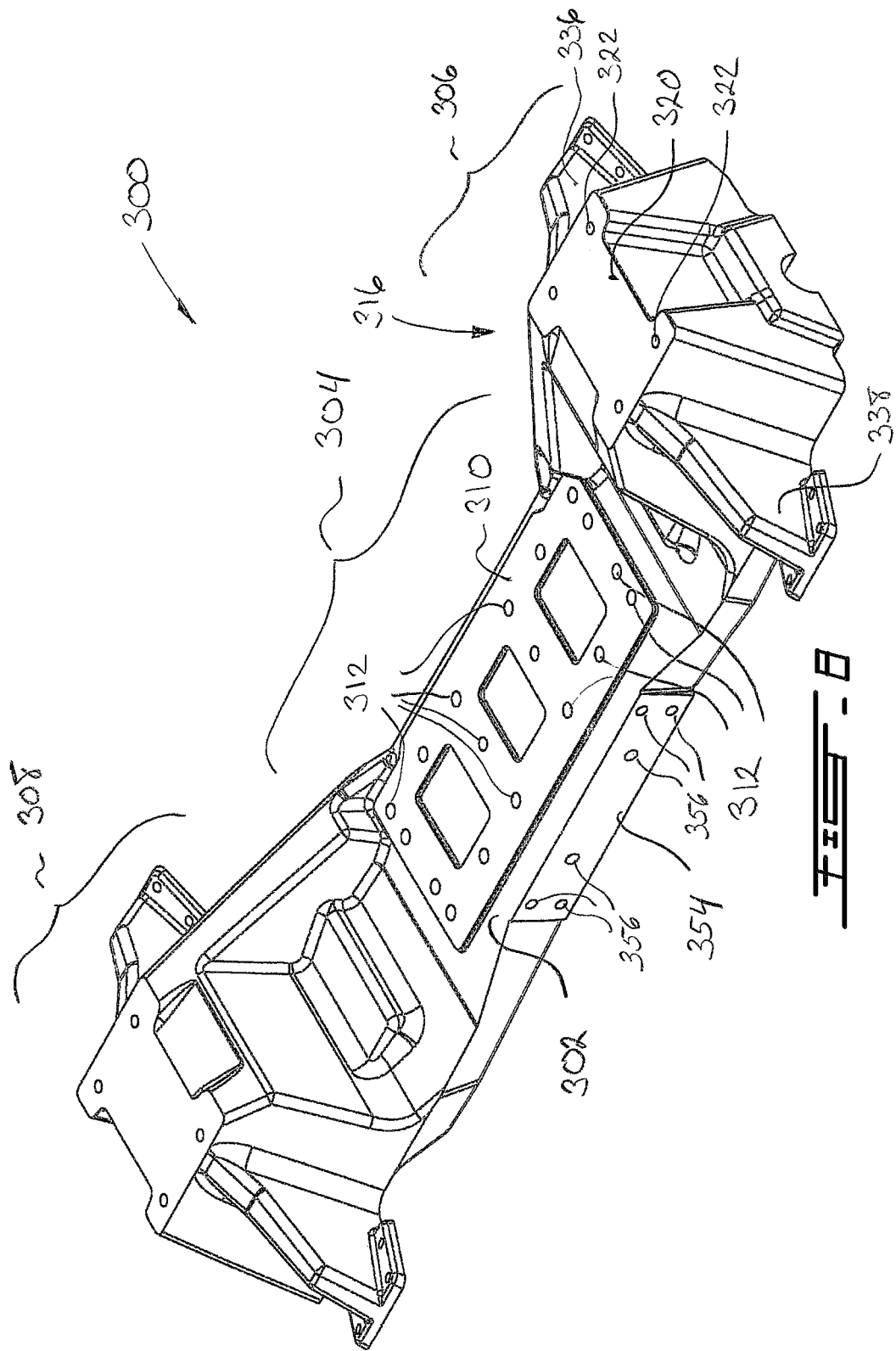

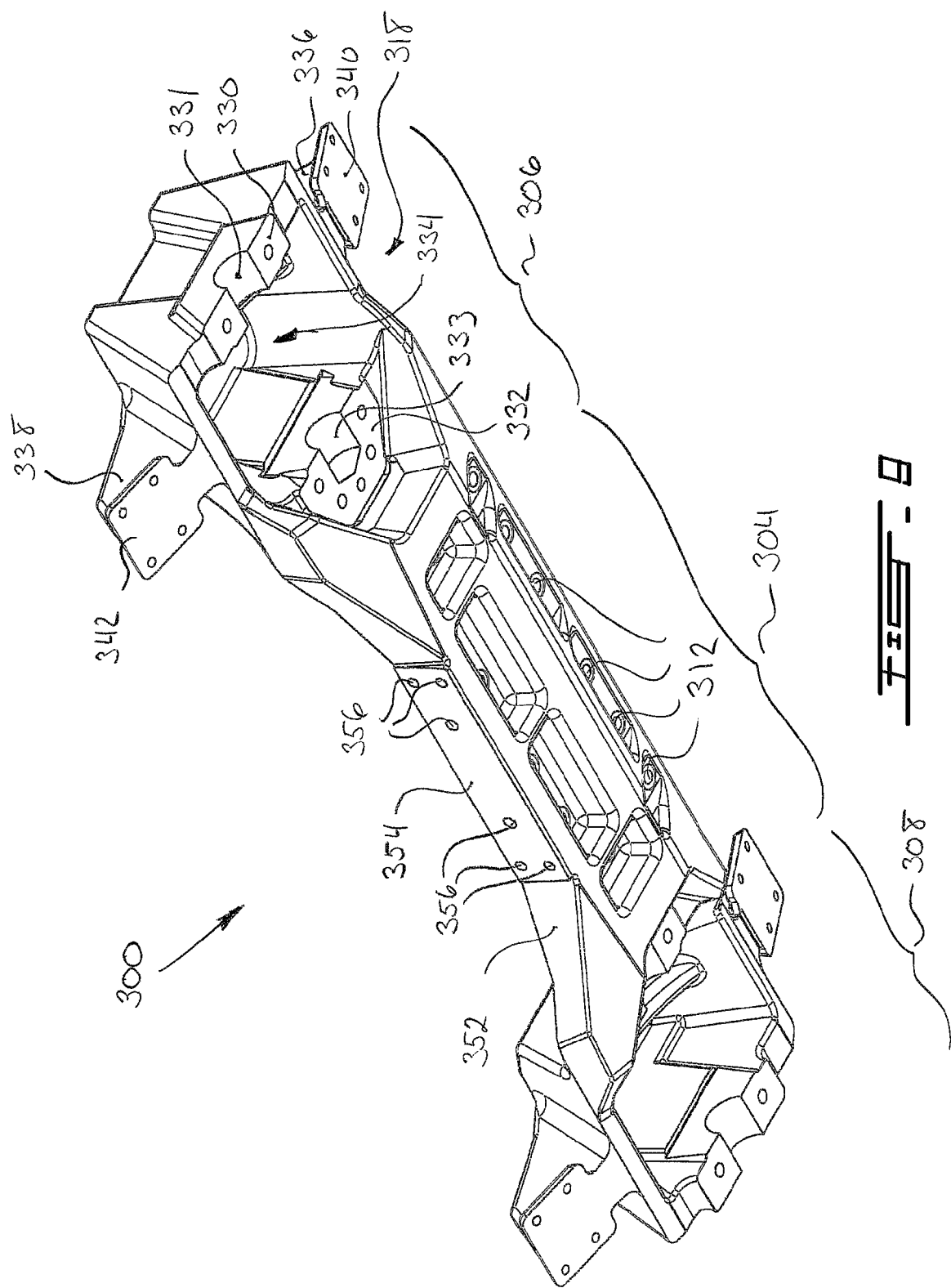

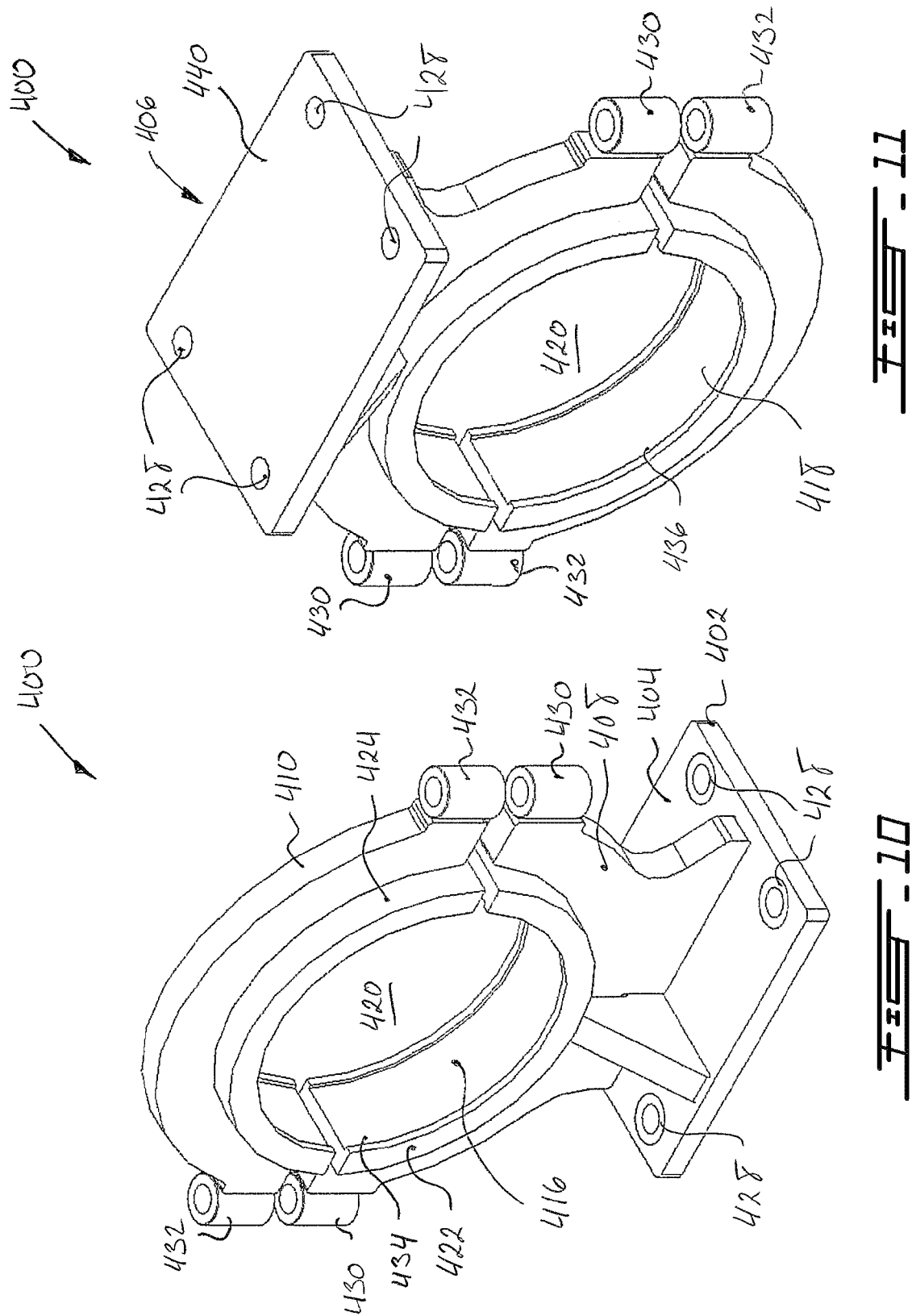

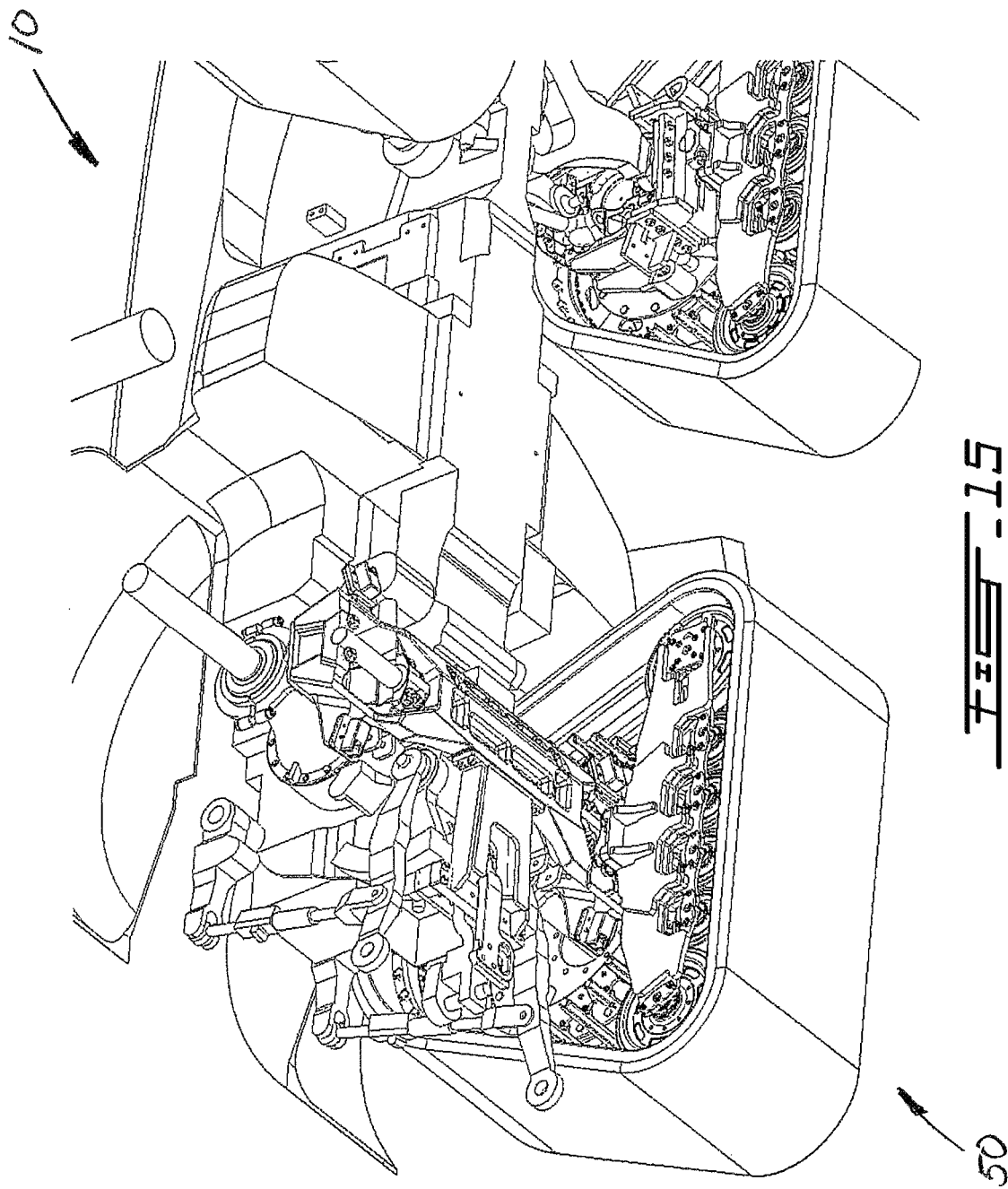

SEMI-GENERIC UNDERFRAME ASSEMBLY FOR A VEHICLE

CROSS-REFERENCE TO RELATED APPLICATIONS

The present patent application claims the benefits of priority of U.S. Provisional Patent Application No. 61/636,154, entitled "Semi-Generic Underframe Assembly for a Vehicle", and filed at the United States Patent and Trademark Office on Apr. 20, 2012, the content of which is incorporated herein by reference.

FIELD OF THE INVENTION

The present invention generally relates to track systems and traction assemblies used as wheel replacement for typically wheeled vehicles. More particularly, the present invention relates to structural assemblies used to mount track systems and traction assemblies on normally wheeled vehicles, and more particularly on heavy normally wheeled vehicles such as, but not limited to, farming and agricultural vehicles (e.g. tractors, harvesters, etc.) and construction and industrial vehicles (e.g. excavators, combines, forestry equipments, etc.).

BACKGROUND OF THE INVENTION

Soil compaction and floatation have always been important issues for farmers operating tractors and other farming vehicles in their fields. It has thus been found advantageous to replace two or even all four wheels of a farming tractor (and of other wheeled vehicles) with track systems which use endless traction bands instead of wheels for propulsion.

Using track systems instead of wheels brings several advantages when operated on soft terrains. The larger surface area of the traction bands improves the floatation and also generally improves the overall traction of the tractor.

However, tractors, and other similar normally wheeled vehicles, are still typically sold with wheels and are typically configured to be operated with wheels. Hence, when an operator wants to replace the wheels of its tractor with track systems, the track systems must be properly secured to the tractor. Since track systems are typically aftermarket products, this installation generally involves the attachment of the track systems to the vehicle at locations which, in some case, were not initially designed to support and/or sustain the additional load imparted by the track systems during use.

This is true of track systems installed as replacement of the rear wheels of a tractor. Indeed, as the rear portion of the tractor is typically configured to receive working implements via implement attachment components such as power takeoff, draw bars, lifting links, etc., there are often only a limited number of possible locations available to secure the track systems to the vehicle without interfering with the implement attachment components. One such location is the rear axle case of the tractor.

However, as the rear axle case, or the other locations, are generally not made nor configured to support track systems, the installation may, in some cases, cause premature wearing or even premature failure of some structures of the tractor (e.g. axle case(s), axle(s), bearing(s), etc.).

Hence, despite the advantages of using track systems on farming tractors and other similar vehicles, there are still some shortcomings that need to be addressed.

SUMMARY OF THE INVENTION

The aforementioned shortcomings can be mitigated by a semi-generic underframe assembly comprising preconfigured mounting locations where track systems can be mounted. The semi-generic underframe assembly generally comprises at least one customized adapter frame particularly configured to be mounted to one or more specific models of vehicles, and at least one generic adapter frame configured to be mounted to the at least one customized adapter frame. The preconfigured mounting locations are generally located on the at least one generic adapter frame.

An underframe assembly in accordance with the principles of the present invention generally comprises a first or main customized adapter frame which is configured to be mounted to a first location (or locations) on the underside of a specific model (or specific models) of vehicle (or vehicles). In that sense, the frames of vehicles such as farming tractors are typically provided, on their underside, with structural mounting holes. The main customized adapter frame is therefore generally customized to be mounted to the particular pattern of structural mounting holes of one or more specific vehicles.

The underframe assembly also comprises a main generic adapter frame which is configured to be mounted to the main customized adapter frame.

Understandably, the main customized adapter frame comprises a portion which is customized to engage the structural mounting holes of one or more specific vehicles, and a portion which is generic such as to properly mate with the main generic adapter frame.

In typical though non-limitative embodiments, the main generic adapter frame comprises predetermined mounting locations where track systems can be installed.

In typical though non-limitative embodiments, the underframe assembly further comprises a second or rear customized adapter frame particularly configured to be mounted to a second location (or locations) on the underside of the vehicle. The second location is typically located longitudinally behind the first location and toward the rear of the vehicle. The second location typically comprises another set of structural mounting holes. The rear customized adapter frame is also configured to be mounted to the main generic adapter frame. As such, the rear customized adapter frame generally comprises a customized portion and a generic portion.

In typical though non-limitative embodiments, the underframe assembly further comprises third and fourth customized adapter frames respectively configured to be mounted at third and fourth locations on the underside of the vehicle. These third and fourth locations are typically respectively laterally spaced from the first location on each side thereof and toward the first and second sides of the vehicle. The third and fourth customized adapter frames are also configured to be mounted to the main generic adapter frame. In that sense, each of the third and fourth customized adapter frames comprises a customized portion and a generic portion. Typically, the third and fourth customized adapter frames are configured to be mounted to the left and right axle cases of the vehicle, and to the main generic adapter frame. Though typically distinct from the main customized adapter frame, in some embodiments, the third and fourth customized adapter frames may be integral with the main customized adapter frame.

In some embodiments, the mounting locations could be respectively located on the third and fourth customized adapter frames.

A semi-generic underframe assembly in accordance with the principles of the present invention therefore generally allows a more robust and possibly more convenient installation of track systems to a vehicle since the semi-generic underframe assembly provides predetermined mounting locations where the track systems can be mounted. These predetermined mounting locations avoid the installation of track systems at inconvenient or even weak locations on the vehicle, thereby generally preventing premature wearing or even failure at these locations.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 8 is a top perspective view of the main generic adapter frame of the underframe assembly of FIG. 1.

FIG. 9 is a bottom perspective view of the main generic adapter frame of the underframe assembly of FIG. 1.

FIG. 10 is a top perspective exploded view of the right customized axle case adapter frame of the underframe assembly of FIG. 1.

FIG. 11 is a bottom perspective exploded view of the right customized axle case adapter frame of the underframe assembly of FIG. 1.

FIG. 15 is a bottom perspective view of the underframe assembly of FIG. 1, assembled and mounted to the farming tractor, and of a track system mounted to the underframe assembly.

DETAILED DESCRIPTION OF THE PREFERRED EMBODIMENT

Figure 1:
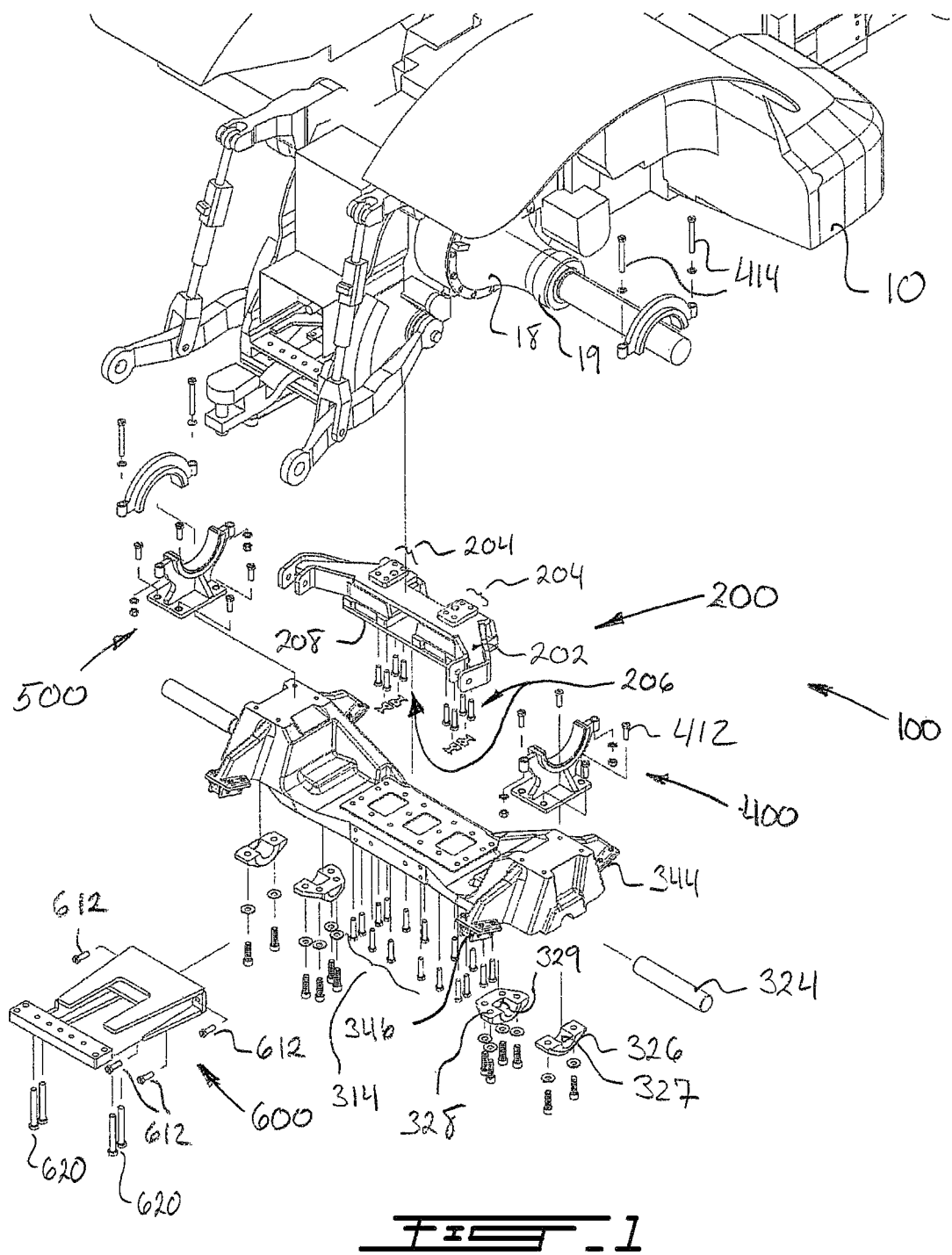
FIG. 1 is rear perspective exploded view of an embodiment of an underframe assembly in accordance with the principles of the present invention, with a partially shown farming tractor.

A novel semi-generic underframe assembly will be described hereinafter. Although the invention is described in terms of specific illustrative embodiments, it is to be understood that the embodiments described herein are by way of example only and that the scope of the invention is not intended to be limited thereby.

Referring first to FIGS. 1 to 4, an embodiment of a semi-generic underframe assembly 100, in accordance with the principles of the present invention, is illustrated. The underframe assembly 100 is configured to be mounted to the underside of a vehicle 10, such as a farming tractor, in order to provide preconfigured mounting locations where track systems 50, used in replacement of wheels, can be mounted (see FIG. 15).

In the present embodiment, the underframe assembly 100 comprises a main customized adapter frame 200, a main generic adapter frame 300, right and left customized axle case adapter frames 400 and 500, and rear customized adapter frame 600. All these frames are configured to be secured together in order to form a solid yet demountable structure.

Referring now to FIGS. 1 and 5 to 7, the main customized adapter frame 200 (hereafter "custom frame 200") is configured to be directly secured to the underside of the vehicle 10. In that sense, referring to FIG. 5, the vehicle 10 typically comprises a series of structural mounting holes 14 which are machined directly into the underside of the vehicle 10, typically in the differential case 12 of the vehicle 10. These structural mounting holes 14 are typically threaded in order to receive threaded fasteners such as bolts. These structural mounting holes 14 are typically provided to allow the installation of accessories such as, but not limited to, draw bar hitch, pick-up hitch, snow plow supporting frame, etc.

Hence, referring back to FIGS. 1 and 5 to 7, the custom frame 200 comprises a top side 202 which is particularly customized to match the structural mounting holes 14 of the vehicle 10. In that sense, in the present embodiment, the top side 202 of the custom frame 200 comprises two mating areas 224 each having fastener holes 204 which extend through the custom frame 200 to the under side 208 thereof. Understandably, the pattern of the fastener holes 204 is substantially identical to the pattern of the structural mounting holes 14 such as to allow mounting fasteners 206, such as bolts, to extend through the fastener holes 204 and into the structural mounting holes 14.

Understandably, to properly secure the custom frame 200 to the underside of the vehicle 10, the threads of the fasteners 206 must match the threads of the structural mounting holes 14.

Figure 7:
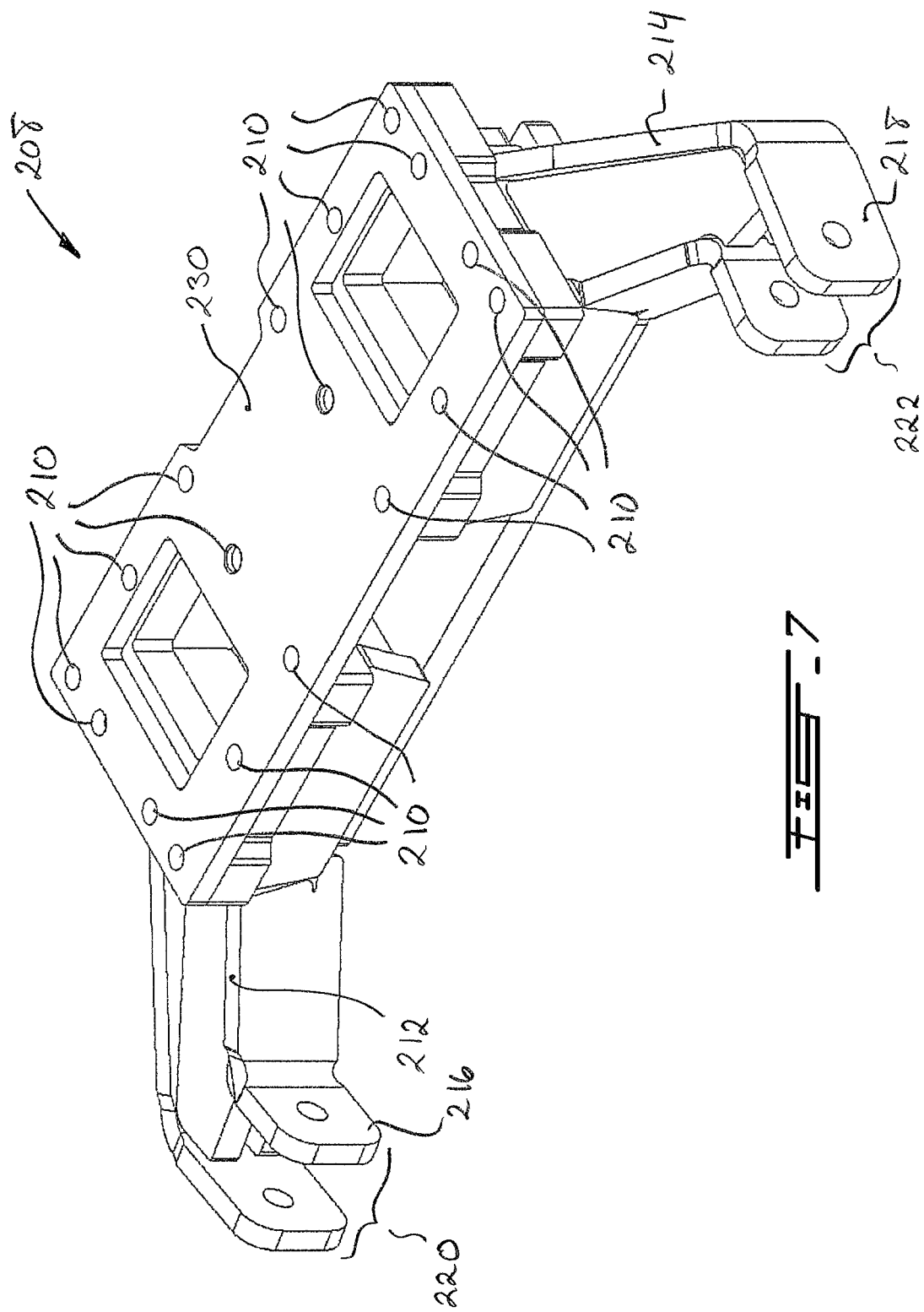
FIG. 7 is a bottom perspective view of the main customized adapter frame of the underframe assembly of FIG. 1.

Referring now to FIG. 7, the under side 208 of the custom frame 200 is substantially generic in the sense that it must fit with the mating area 310 of the top side 302 of the central portion 304 of the main generic adapter frame 300 (hereafter "the generic frame 300"). Hence, in the present embodiment, the under side 208 of the custom frame 200 comprises a substantially flat mating area 230 provided with a series of mounting holes 210 which match fastener holes 312 of the generic frame 300 (see FIG. 8). In the present embodiment, mounting holes 210 are threaded in order to receive the threaded fasteners 314 such as bolts (see FIG. 1).

Understandably, different custom frames would have different configurations of top sides in order to match different configurations of structural mounting holes on different vehicles. However, these different custom frames would typically have similar, if not identical, under side configurations in order to all fit on the same generic frame 300.

Figure 6:
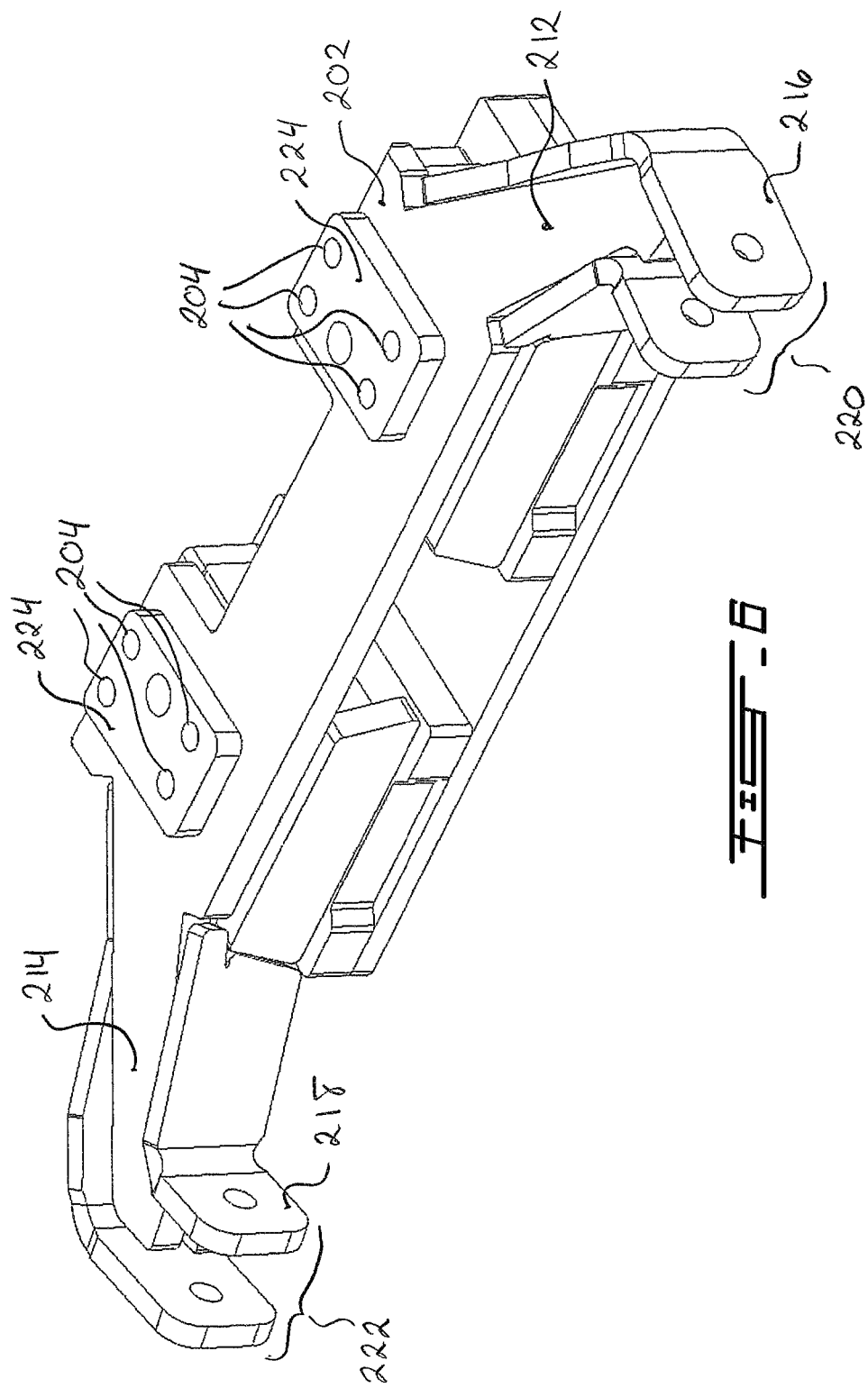
FIG. 6 is a top perspective view of the main customized adapter frame of the underframe assembly of FIG. 1.

Referring to FIGS. 6 and 7, in the present embodiment, the custom frame 200 comprises two laterally extending portions 212 and 214. These lateral portions 212 and 214, which are slightly rearwardly angled as shown in FIGS. 1, 6 and 7, are provided, at their respective extremities 216 and 218, with hitch stabilizing portions 220 and 222.

Hitch stabilizing portions 220 and 222 can be used, for instance, to receive and support stabilizers (not shown) commonly used with agricultural tractors.

Understandably, the configuration of the lateral portions 212 and 214 and of the hitch stabilizing portions 220 and 222 is customized to the needs of the vehicle 10 for which the custom frame 200 is customized. Other versions of the custom frame 200 could have different configurations of lateral portions 212 and 214 and of the hitch stabilizing portions 220 and 222 or could be devoid of lateral portions 212 and 214 and hitch stabilizing portions 220 and 222 altogether.

Referring now to FIGS. 1, 8 and 9, the generic frame 300 will be described in more details.

In the present embodiment, the generic frame 300 generally comprises three portions, namely a central portion 304, a first (or right) lateral portion 306, and a second (or left) lateral portion 308.

Though in the present embodiment, the three portions 304, 306 and 308 are unitary, in other embodiments, the three portions 304, 306 and 308 could be distinct yet secured (e.g. bolted) to each other.

As already mentioned, the central portion 304 is configured to receive, on its top side 302, the under side 208 of the custom frame 200. As indicated above, in the present embodiment, the top side 302 of the central portion 304 is provided with a substantially flat mating area 310 which is configured to substantially match the corresponding mating area 230 on the under side 208 of the custom frame 200.

To properly secure the generic frame 300 to the custom frame 200, the central portion 304 is provided with fastener holes 312 which extend all the way through the central portion 304 and through the mating area 310. These fastener holes 312 allow the fasteners 314 (see FIG. 1) to extend through the central portion 304 of the generic frame 300 and into the mounting holes 210 in the mating area 230 of the under side 208 of the custom frame 200.

As indicated above, in the present embodiment, fasteners 314 are threaded fasteners (e.g. bolts) and are configured to engage the threaded mounting holes 210 in the mating area 230 on the under side 208 of the custom frame 200.

Whereas the central portion 304 of the generic frame 300 is configured to mate with the custom frame 200, the right and left lateral portions 306 and 308 are respectively configured to mate with the right and left customized axle case adapter frame 400 ad 500 (hereafter "the right axle case frame 400" and "the left axle case frame 500") which will be described in more details below.

Right and left portions 306 and 308 are substantially symmetric in nature and thus, only the right portion 306 will be described.

As best shown in FIGS. 8 and 9, right portion 306 comprises a top side 316 and an under side 318.

The top side 316 comprises a substantially flat mating area 320 configured to mate with a corresponding mating area 440 on the under side 406 of the base 402 of the right axle case frame 400 (see FIG. 11).

Notably, as best shown in FIG. 8, the mating area 320 of the right portion 306 is located in a different plane than the mating area 310 of the central portion 304. This is mainly due to the configuration of the underside of the vehicle 10 and more particularly of the configuration of the differential and axle cases.

The mating area 320 of the right portion 306 is provided with mounting holes 322 which are configured to receive the fasteners 412 used to secure the right axle case frame 400 to the right portion 306 (see FIG. 1). In the present embodiment, the fasteners 412 are threaded fasteners (e.g. bolts) and the mounting holes 322 are correspondingly threaded.

Referring now to FIGS. 1-4 and 9, in the present embodiment, the under side 318 of the right portion 306 is configured to provide a first (or right) mounting location 360 for a track system 50 (see FIG. 15).

In that sense, in the present embodiment, the under side 318 is configured to receive and support a shaft 324 which is held in place by two holding members 326 and 328 which respectively mate with two mating areas 330 and 332.

In the present embodiment, holding members 326 and 328 and mating areas 330 and 332 respectively comprise semi-cylindrical recesses 327, 329, 331 and 333. Together, recesses 327 and 331 form a circular opening which holds one end of the shaft 324 in place, and recesses 329 and 333 form another circular opening which holds the other end of the shaft 324 in place. Once secured to the under side 318 of the right portion 306, the shaft 324 provides a location where a mounting or support frame of the track system 50 can be pivotally connected.

In other embodiments, the shaft 324 could have a shape other than cylindrical and the recesses 327, 329, 331, 333 would understandably be configured to form openings properly shaped to receive the non-cylindrical shaft 324.

As best shown in FIG. 9, in order to provide space for the portion of the support frame of the track system 50 which is connected to the shaft 324, the under side 318 of the right portion is typically hollow and thus provided with an internal recess 334.

Still referring to FIG. 9, in the present embodiment, the right portion 306 is also provided with forwardly and rearwardly extending portions 336 and 338. These portions 336 and 338 are configured to receive, on their respective under side 340 and 342, stopping or limiting members 344 and 346 (see FIG. 3). The limiting members 344 and 346 are configured to limit the pivotal movement of the track system 50 with respect to the shaft 324.

Figure 3:
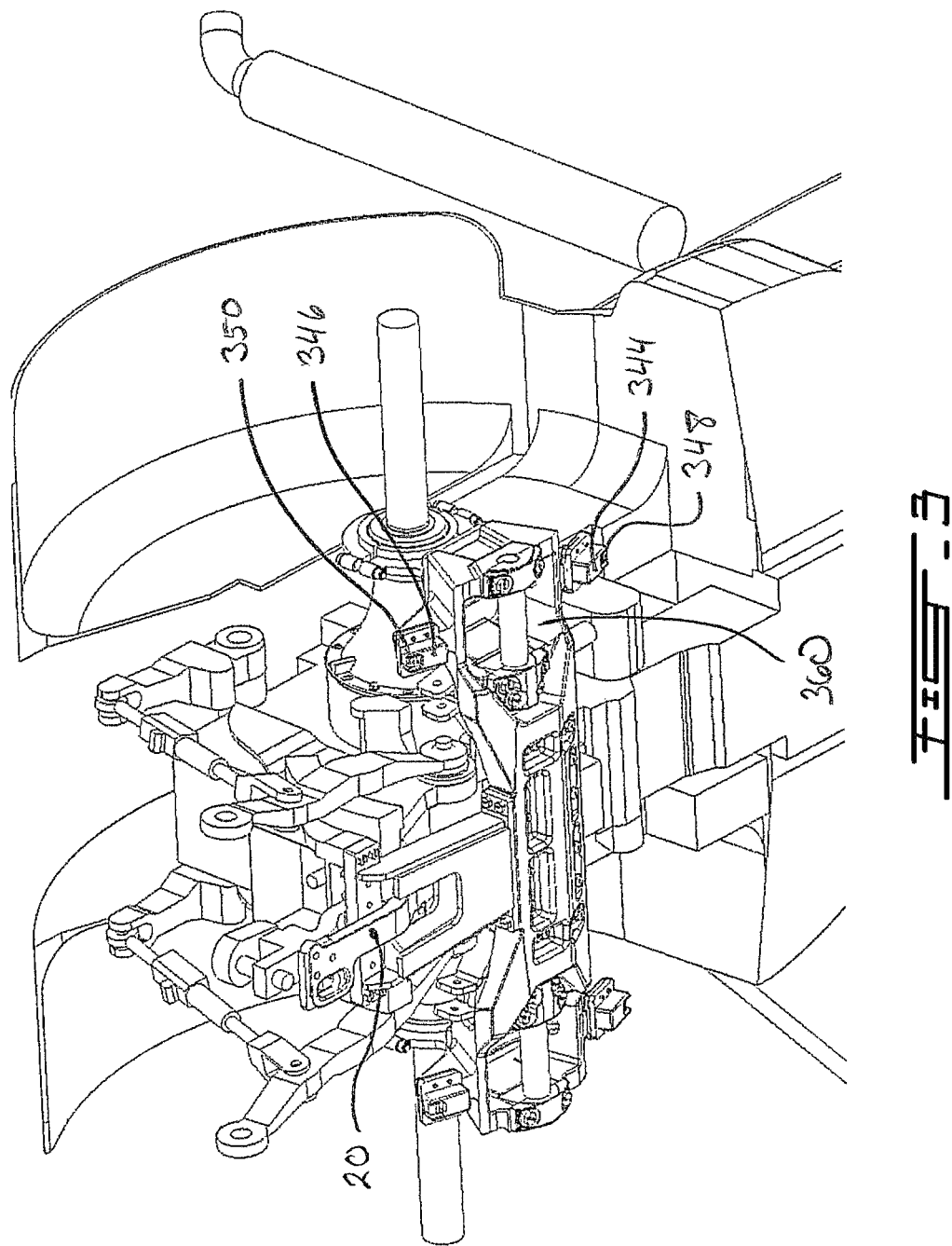
FIG. 3 is a bottom perspective view of the underframe assembly of FIG. 1, assembled, and mounted to the farming tractor.
Figure 4:
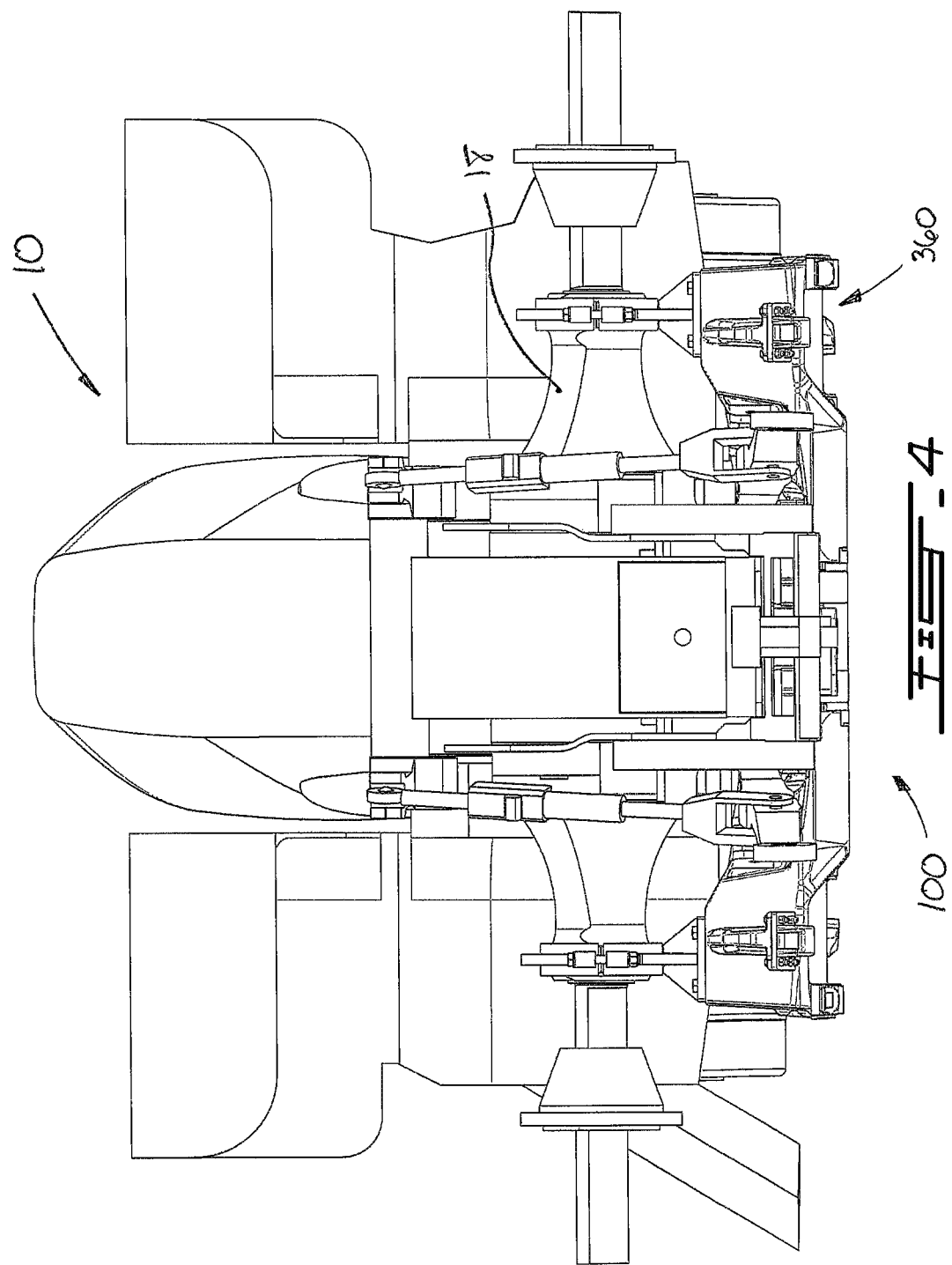
FIG. 4 is a rear view of the underframe assembly of FIG. 1, assembled, and mounted to a farming tractor.

To reduce the impacts between the track system 50 and the limiting members 344 and 346, the limiting members 344 and 346 preferably respectively comprise elastomeric cushion 348 and 350 (see FIG. 3).

Understandably, in other embodiments, the position and/or configuration of the first and second mounting locations 360 on the generic frame 300 could be different from the configuration described above. Also, in other embodiments, the first and second mounting locations could possibly be respectively located on the right and left axle frames 400 and 500 instead than on the generic frame 300.

Referring back to FIGS. 1, 8 and 9, in the present embodiment, the central portion 304 also comprises a rear side 352 which comprises a substantially flat mating area 354.

The mating area 354 is configured to mate with a corresponding mating area 606 on the front portion 602 of the rear customized adapter frame 600 (hereafter the "rear custom frame 600").

The mating area 354 is provided with mounting holes 356 configured to receive fasteners 612. In the present embodiment, fasteners 612 are threaded fasteners (e.g. bolts) and the mounting holes 356 are correspondingly threaded.

Notably, it is to be understood that the generic frame 300 could be generic only for vehicles of a certain size. Indeed, there could be generic frames 300 of various sizes to accommodate vehicles of various sizes.

Referring now to FIGS. 1, 2, 10 and 11, the right axle case frame 400 will be described in more details. Understandably, as the left axle case frame 500 is substantially a mirror image of the right axle case frame 400, only the right axle case frame 400 will be described.

Figure 2:
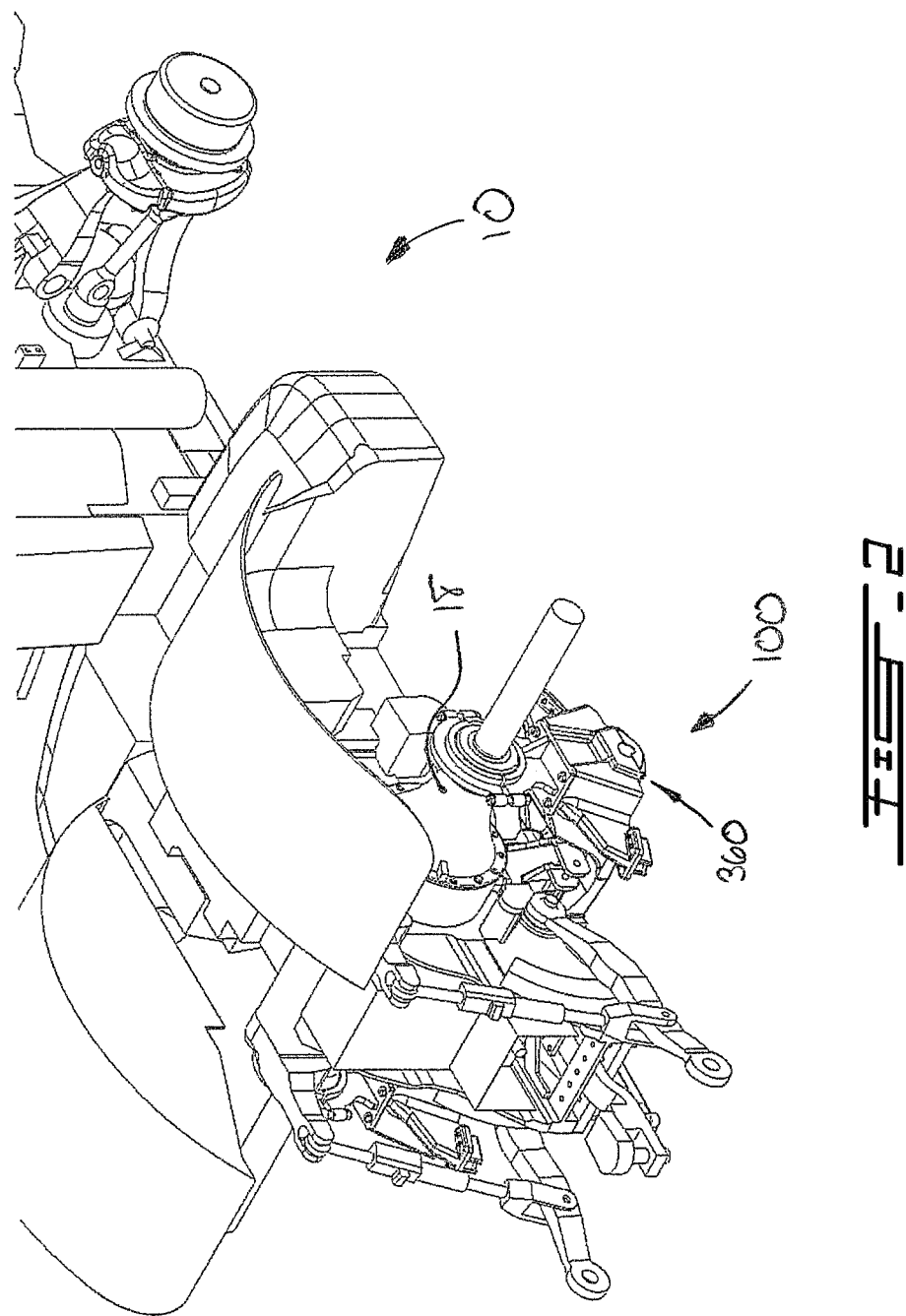
FIG. 2 is a rear perspective view of the underframe assembly of FIG. 1, assembled, and mounted to the farming tractor.

As shown in FIG. 2, the right axle case frame 400 is configured to be mounted to the generic frame 300 and also to the right axle case 18 of the vehicle 10. In that sense, the right axle case frame 400 comprises a substantially generic base 402 having a top side 404 and an under side 406.

In the present embodiment, the top side 404 comprises a first clamping member 408 which is configured to mate with a second clamping member 410. In the present embodiment, first and second clamping members 408 and 410 are secured together via fasteners 414, such as bolts, extending through pairs of sleeves 430 and 432 (see FIG. 1).

As best shown in FIG. 2, first and second clamping members 408 and 410 form a clamp configured to circumscribe the axle case 18. In that sense, first clamping member 408 comprises a semi-circular recess 416 and second clamping member 410 comprises a corresponding semi-circular recess 418; the two semi-circular recesses 416 and 418 forming a circular opening 420 sized to receive the axle case 18.

Understandably, whereas the base 402 is substantially generic in order to properly mate with the generic frame 300, the configuration of the clamping members 408 and 410 will be customized in order to fit on one or more specific vehicles. In that sense, though the clamping members 408 and 410 shown in the figures are configured to engage an axle case 18 having a substantially circular section, the clamping members 408 and 410 could be configured to engage an axle case 18 having a non-circular section (e.g. a square or rectangular section).

Still, in the present embodiment, as best shown in FIGS. 10 and 11, first clamping member 408 comprises a first half collar 422 defining a first inner channel 434, and similarly, second clamping member 410 comprises a second half collar 424 defining a second inner channel 436. When the first and second clamping members 408 and 410 are assembled around the axle case 18, the first and second inner channels 434 and 436 form a circular inner channel into which is received a circumferential rib 19 radially extending from the axle case 18 (see FIG. 1). Understandably, the engagement between the circular inner channel and the rib 19 prevents lateral movements of the right axle case frame 400 during operation of the vehicle 10.

The top side 404 of the base 402 also comprises fastener holes 428 which extend through the base 402 all the way to the under side 406. The fastener holes 428 are configured to receive fasteners 412 used to secure the right axle case frame 400 to the mating surface 320 of the right portion 306 of the generic frame 300 as indicated above.

To properly secure the right axle case frame 400 to the mating surface 320 of the right portion 306 of the generic frame 300, the under side 406 of the base 402 is configured as a substantially flat mating area 440 which substantially match the mating area 320.

Still, though not shown, shim plates could be mounted between the base 402 of the right axle case frame 400 and the mating surface 320 of the right portion 306 of the generic frame 300 to properly adjust the right axle case frame 400 to the right axle case 18.

Though the right axle case frame 400 of the present embodiment comprises customized clamping members 408 and 410 configured to engage the axle case 18, in other embodiments, the right axle case frame 400 could comprise one or more other customized structures in order to engage the axle case 18 differently, or even to engage other structure or structures on the underside of the vehicle. For instance, if the axle case 18 is provided with structural mounting holes, then the custom portion or structure(s) of the right axle case frame 400 could be configured to be secured to these structural mounting holes.

In addition, though the right and left axle case frames 400 and 500 of the present embodiment have been described as distinct from the custom frame 200, in other embodiments, the right and left axle case frames 400 and 500 could be made integral with the custom frame 200.

Referring now to FIGS. 1, 2 and 12-14, the rear custom frame 600 will be described in more details.

Figure 5:
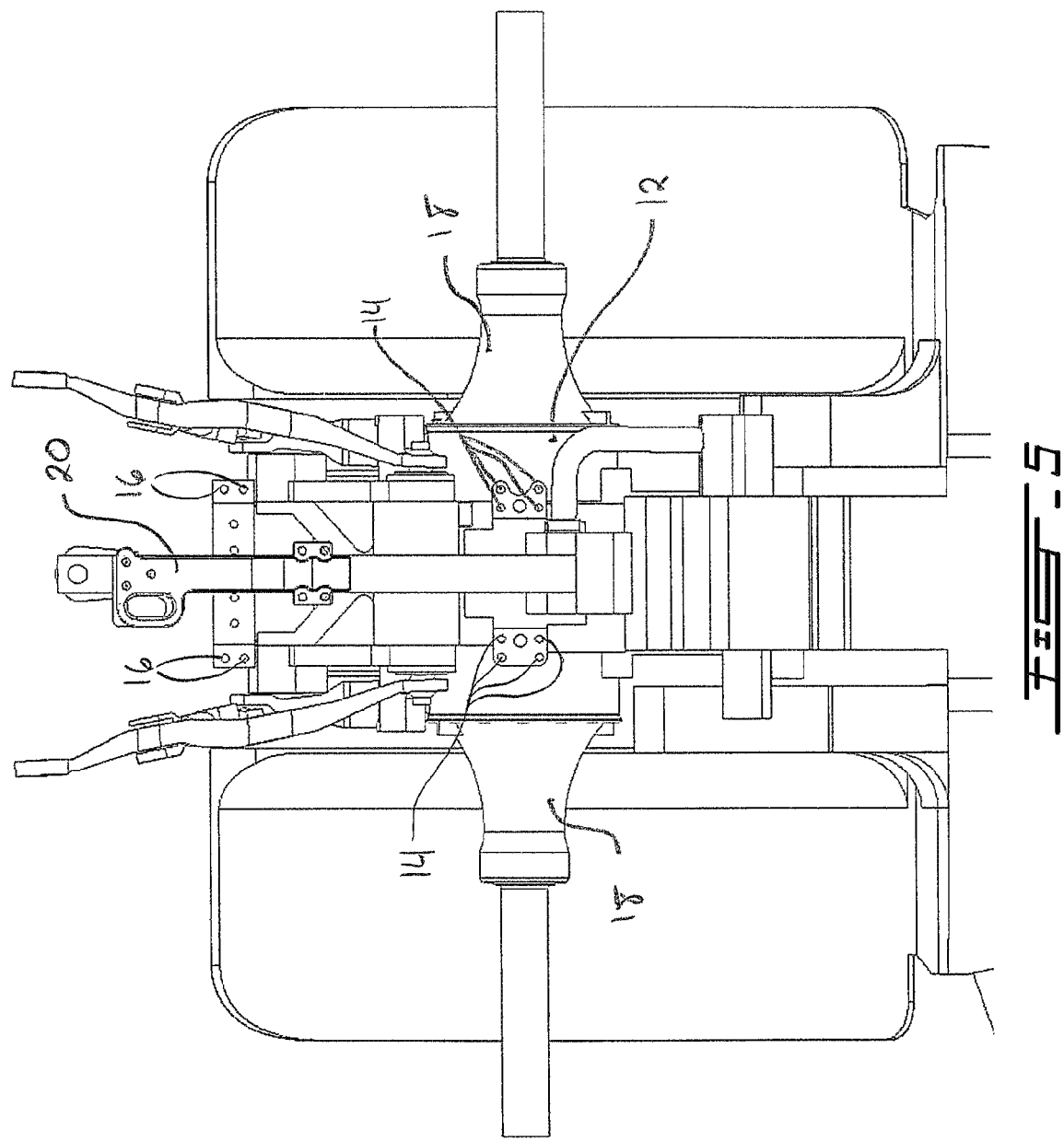
FIG. 5 is a bottom view of the farming tractor of FIG. 1.

The rear custom frame 600 is configured to be mounted to both the generic frame 300 and to another set of structural mounting holes 16 on the underside of the vehicle 10 (see FIG. 5). In that sense, as for the other custom frames, the rear custom frame 600 comprises a substantially generic portion configured to mate with the generic frame 300 and a substantially custom portion customized to mate with one or more specific vehicles.

In the present embodiment, the rear custom frame 600 comprises a front portion 602 and a rear portion 604.

The front portion 602 is configured to mate with the mating area 354 of the generic frame 300. In that respect, the front portion 602 comprises, at its extremity, a substantially flat mating area 606. In the present embodiment, the mating area 606 is located on a laterally extending plate 608. The plate 608 comprises fasteners holes 610 which are configured to receive the already introduced fasteners 612 (see FIG. 1). Understandably, the pattern of the fastener holes 610 must substantially match the pattern of mounting holes 356 in the mating area 354 of the generic frame 300.

The rear portion 604 is configured to mate with the second set of structural mounting holes 16 on the underside of the vehicle 10 (see FIG. 5). In that sense, the rear portion 604 is customized to fit one or more specific vehicles. As for the front portion 602, the rear portion 604 comprises, at its extremity, a substantially flat mating area 614 located on a laterally extending drawbar supporting plate 616. The plate 616 also comprises a series of fastener holes 618 extending therethrough and configured to receive the fasteners 620 used to secured the rear portion 604 to the structural mounting holes 16 (see FIG. 1). In the present embodiment, since the structural mounting holes 16 are threaded, fasteners 620 are correspondingly threaded fasteners (e.g. bolts).

The plate 616 also comprises attachment holes 622 which serve as attachment locations for the drawbar 20 (see FIG. 3).

Notably, in the present embodiment, the drawbar supporting plate 616 of the rear custom frame 600 is typically configured to replace the drawbar support plate (not shown) originally mounted to the vehicle 10. Still, in the present embodiment, the drawbar supporting plate 616 is part of the rear custom frame 600.

Figure 12:
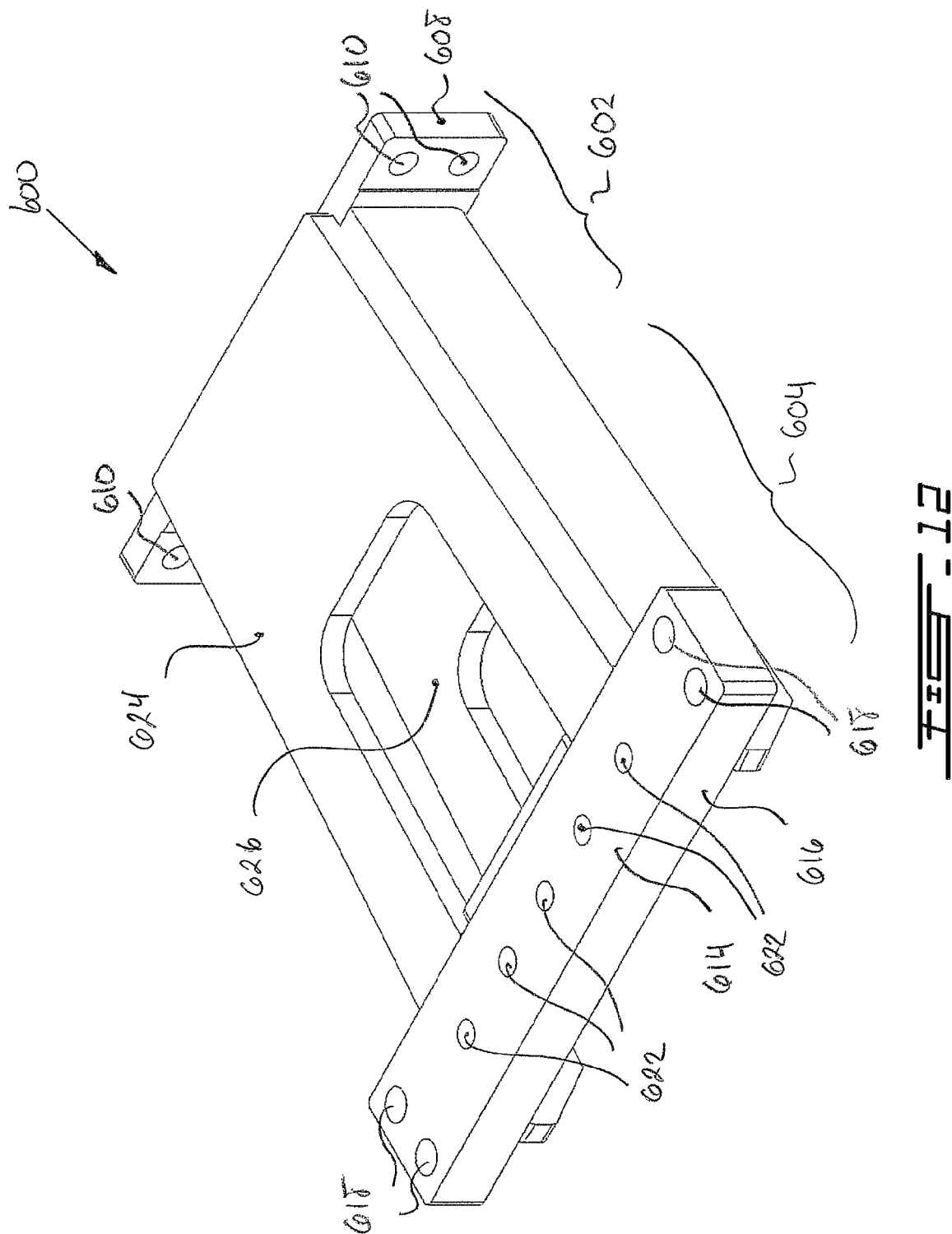
FIG. 12 is a top perspective view of the rear customized adapter frame of the underframe assembly of FIG. 1.
Figure 13:
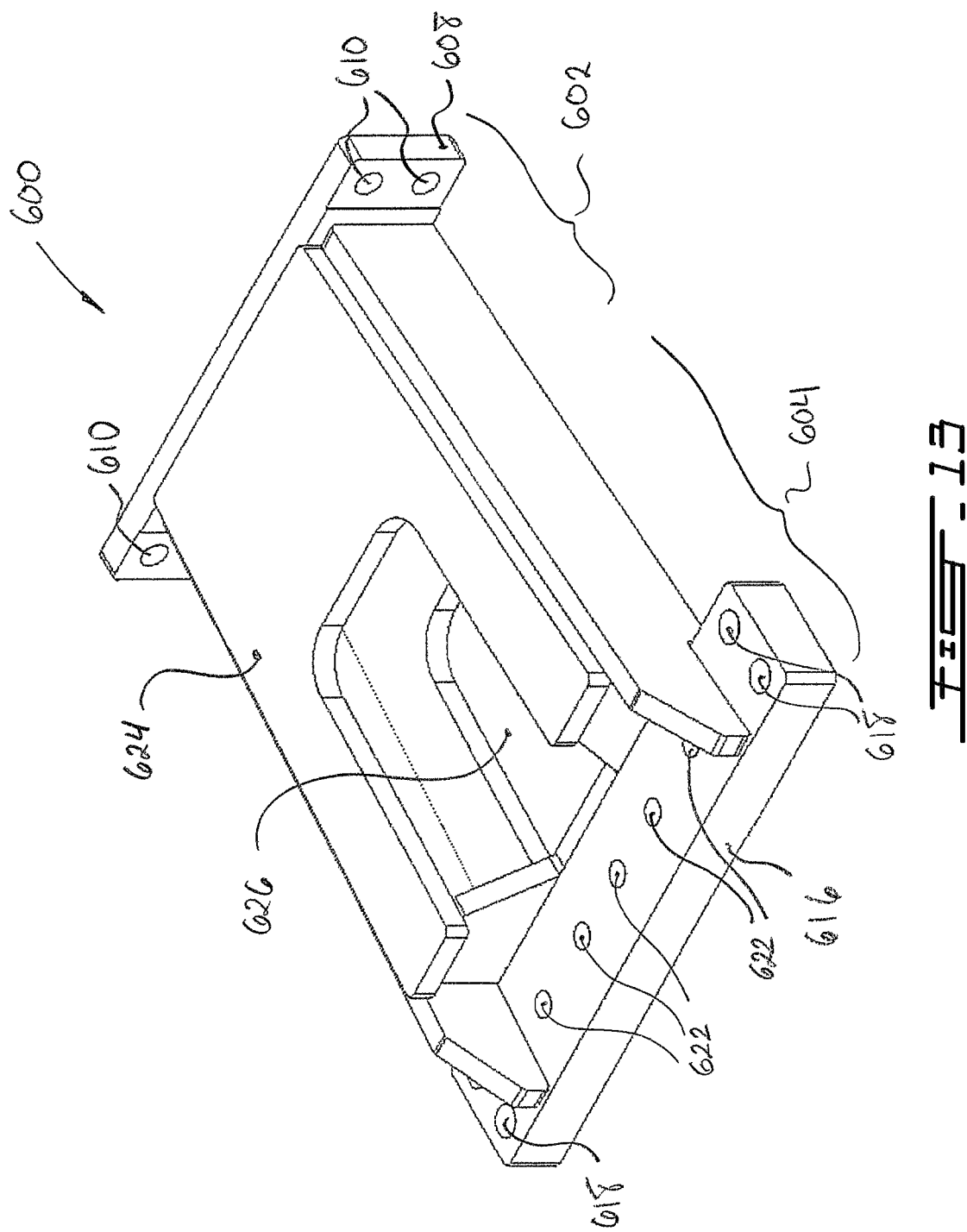
FIG. 13 is a bottom perspective view of the rear customized adapter frame of the underframe assembly of FIG. 1.
Figure 14:
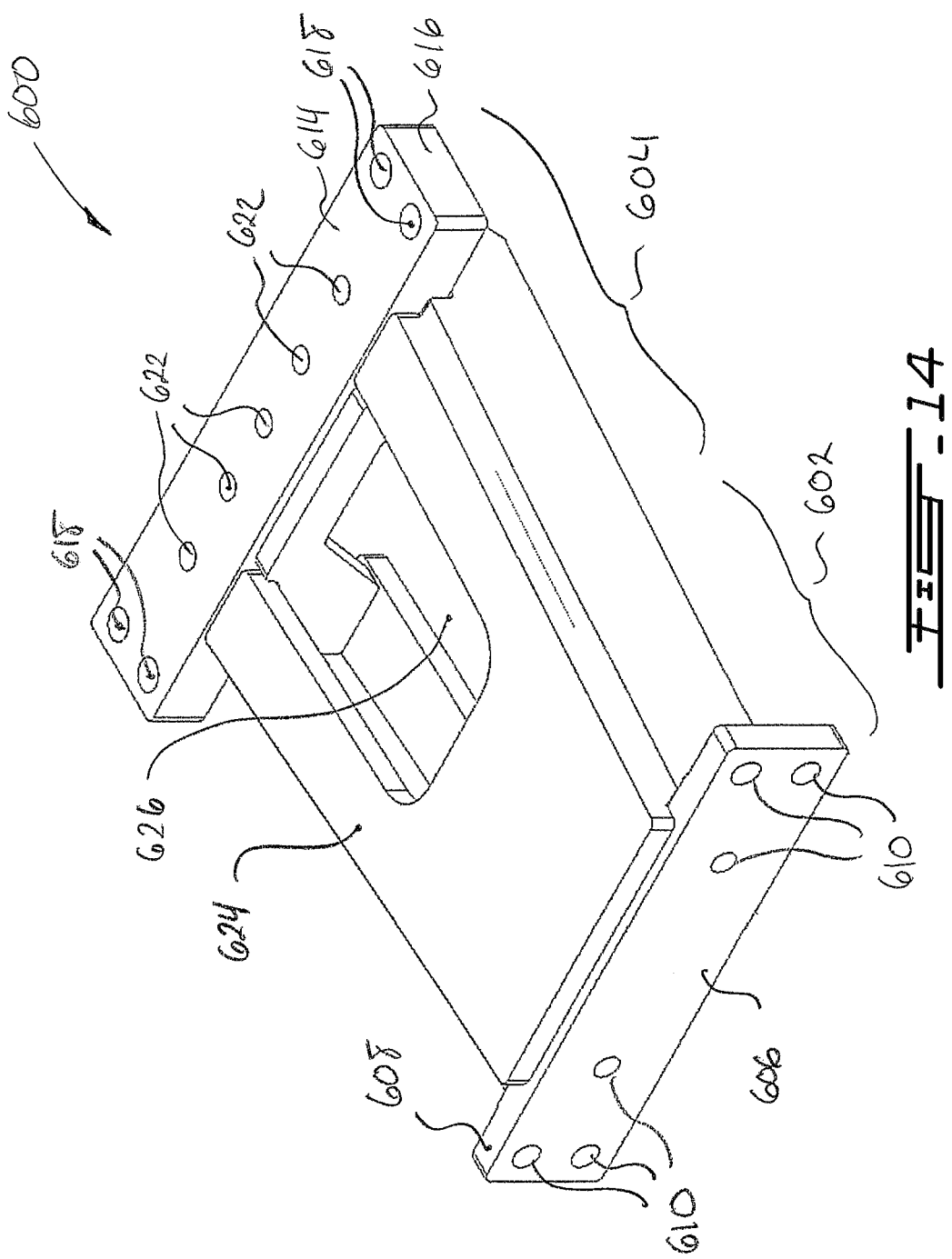
FIG. 14 is another top perspective view of the rear customized adapter frame of the underframe assembly of FIG. 1.

As best shown in FIGS. 12 to 14, the rear custom frame 600 also comprises a main body 624 which configuration can vary. In the present embodiment, the body 624 comprises an opening 626 through which can extend the drawbar 20 (see FIG. 3).

Notably, though the various mating areas of the present embodiment of the underframe assembly 100 are substantially flat, in other embodiments, these various mating areas could have other configurations.

In addition to the attachment of the semi-generic underframe 100 at a first location (i.e. to the structural mounting holes 14), in the present embodiment, the semi-generic underframe 100 is also attached to the vehicle 10 at three additional locations via the attachment of the right and left axle case frames 400 and 500 to the axle cases 18 and via the attachment of the rear custom frame 600 to the rear structural mounting holes 16. By having these three additional attachment locations, any torque or rotational movements transmitted by the track systems 50 to the semi-generic underframe 100, and more particularly the custom frame 200 and the generic frame 300, will be at least partially transmitted or distributed to the three additional attachment locations, thereby generally limiting the load supported by the custom frame 200 and the generic frame 300 during operation of the vehicle 10. Understandably, in other embodiments, the semi-generic underframe 100 could be attached to the vehicle 10 at more, or possibly less, than four locations.

In that sense, other embodiments could comprise more or less custom frames. For instance, some embodiments could further comprise a front custom frame. Other embodiments could be provided without rear custom frame, without right and left custom frames, or even without both the rear custom frame and the right and left custom frames.

In its most basic form, the semi-generic underframe assembly could possibly comprise only a main custom frame and a main generic frame. Understandably, different configurations of undersides of vehicles could warrant the need for more or less custom frames.

In all the embodiments though, the underframe assembly comprises mounting locations where track systems can be properly mounted.

Understandably, through the use of a combination of custom and generic frames, a semi-generic underframe assembly, in accordance with the principles of the present invention, can be mounted on different vehicles such as to provide preconfigured mounting locations wherein track systems can be installed. Moreover, the attachment of the underframe assembly 100 at several locations on the underside of the vehicle 10 effectively spreads the load imparted by the track systems at these several locations, thereby limiting the load supported by each location. Therefore, a semi-generic underframe assembly, in accordance with the principles of the present invention, provides a useful way for vehicle operators to properly install track systems on their vehicle while avoiding installation at inconvenient and/or weak locations.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A semi-generic underframe assembly for use on a vehicle, the assembly comprising:
   a) a first customized adapter frame configured to be mounted to an underside of the vehicle at a first location, the first customized adapter frame comprising a first customized mating portion configured to be attached at the first location on the underside of the vehicle, and a first generic mating portion;
   b) a generic adapter frame configured to be mounted to the first customized adapter frame, the generic adapter frame comprising a central portion, a first lateral portion, and a second lateral portion, the generic adapter frame comprising a second generic mating portion substantially matching the first generic mating portion and configured to mate with the first generic mating portion;
   c) a second customized adapter frame, the second customized adapter frame being configured to be mounted to the underside of the vehicle at a second location and to the generic adapter frame; and
   d) a third customized adapter frame, the third customized adapter frame being configured to be mounted to the underside of the vehicle at a third location and to the generic adapter frame;
   wherein the assembly comprises at least one first preconfigured mounting location and at least one second preconfigured mounting location.

2. A semi-generic underframe assembly as claimed in claim 1, wherein the second generic mating portion is located on the central portion.

3. A semi-generic underframe assembly as claimed in claim 1, wherein the generic adapter frame comprises a third generic mating portion located on the first lateral portion, and a fourth generic mating portion located on the second lateral portion, wherein the second customized adapter frame comprises a second customized mating portion configured to be attached at the second location on the underside of the vehicle, and a fifth generic mating portion substantially matching one of the third and fourth generic mating portions, and wherein the third customized adapter frame comprises a third customized mating portion configured to be attached at the third location on the underside of the vehicle, and a sixth generic mating portion substantially matching the other of the third and fourth generic mating portions.

4. A semi-generic underframe assembly as claimed in claim 3, further comprising a fourth customized adapter frame configured to be mounted to the underside of the vehicle at a fourth location and to the generic adapter frame.

5. A semi-generic underframe assembly as claimed in claim 4, wherein the generic adapter frame comprises a seventh generic mating portion, wherein the fourth customized adapter frame comprises a fourth customized mating portion configured to be attached at the fourth location on the underside of the vehicle, and an eighth generic mating portion substantially matching the seventh mating portion.

6. A semi-generic underframe assembly as claimed in claim 5, wherein the fourth customized adapter frame comprises a front portion and a rear portion, wherein the fourth customized mating portion is located on the rear portion, and wherein the eighth generic mating portion is located on the front portion.

7. A semi-generic underframe assembly as claimed in claim 6, wherein the fourth location on the underside of the vehicle is longitudinally spaced from the first location toward a rear of the vehicle.

8. A semi-generic underframe assembly as claimed in claim 1, wherein the second location on the underside of the vehicle is laterally spaced from the first location toward a first side of the vehicle, and wherein the third location on the underside of the vehicle is laterally spaced from the first location toward a second side of the vehicle.

9. A semi-generic underframe assembly as claimed in claim 1, wherein the at least one first preconfigured mounting location is located on the first lateral portion, and wherein the at least one second preconfigured mounting location is located on the second lateral portion.

10. A vehicle having mounted thereto an underframe assembly as claimed in claim 9.

11. A vehicle as claimed in claim 10, the vehicle comprises a first track system mounted to the at least one first preconfigured mounting location, and a second track system mounted to the at least one second preconfigured mounting location.

12. A semi-generic underframe assembly as claimed in claim 1, wherein the at least one first preconfigured mounting location is located on the second customized adapter frame, and wherein the at least one second preconfigured mounting location is located on the third customized adapted frame.

13. A vehicle having mounted thereto an underframe assembly as claimed in claim 12.

14. A vehicle as claimed in claim 13, the vehicle comprises a first track system mounted to the at least one first preconfigured mounting location, and a second track system mounted to the at least one second preconfigured mounting location.

15. A semi-generic underframe assembly as claimed in claim 1, further comprising a fourth customized adapter frame configured to be mounted to the underside of the vehicle at a fourth location and to the generic adapter frame.

16. A semi-generic underframe assembly as claimed in claim 15, wherein the generic adapter frame comprises a third generic mating portion, wherein the fourth customized adapter frame comprises a second customized mating portion configured to be attached at the fourth location on the underside of the vehicle, and a fourth generic mating portion substantially matching the third generic mating portion.

17. A semi-generic underframe assembly as claimed in claim 16, wherein the fourth customized adapter frame comprises a front portion and a rear portion, wherein the second customized mating portion is located on the rear portion, and wherein the fourth generic mating portion is located on the front portion.

18. A semi-generic underframe assembly as claimed in claim 15, wherein the fourth location on the underside of the vehicle is longitudinally spaced from the first location toward a rear of the vehicle.

19. A vehicle having mounted thereto an underframe assembly as claimed in claim 1.

20. A vehicle as claimed in claim 19, the vehicle comprises a first track system mounted to the at least one first preconfigured mounting location, and a second track system mounted to the at least one second preconfigured mounting location.

* * * * *